US012725456B2

(12) United States Patent
Rodriguez

(10) Patent No.: US 12,725,456 B2
(45) Date of Patent: Sep. 1, 2026

(54) ELECTRONIC DEVICE AND METHOD FOR ENHANCING DETECTION OF MORPHED BIOMETRIC MODALITY DATA

(71) Applicant: Daon Technology, Douglas (IM)

(72) Inventor: Raphael A. Rodriguez, Marco Island, FL (US)

(73) Assignee: Daon Technology, Douglas (IM)

( * ) Notice: Subject to any disclaimer, the term of this patent is extended or adjusted under 35 U.S.C. 154(b) by 21 days.

(21) Appl. No.: 19/052,337

(22) Filed: Feb. 13, 2025

(65) Prior Publication Data

US 2026/0148588 A1 May 28, 2026

Related U.S. Application Data

(63) Continuation of application No. 18/960,368, filed on Nov. 26, 2024, now Pat. No. 12,307,826.

(51) Int. Cl.

*G06V 40/40* (2022.01)
*G06V 10/75* (2022.01)
*G06V 10/77* (2022.01)
*G06V 10/774* (2022.01)
*G06V 10/98* (2022.01)

(Continued)

(52) U.S. Cl.

CPC ............ *G06V 40/40* (2022.01); *G06V 10/751* (2022.01); *G06V 10/7715* (2022.01); *G06V 10/774* (2022.01); *G06V 10/993* (2022.01); *G06V 40/171* (2022.01); *G06V 40/176* (2022.01); *G06V 10/87* (2022.01)

(58) Field of Classification Search

CPC .. G06V 40/40; G06V 10/751; G06V 10/7715; G06V 10/774; G06V 10/993; G06V 40/171; G06V 40/176; G06V 10/87

See application file for complete search history.

(56) References Cited

U.S. PATENT DOCUMENTS

| | | | | |
|---|---|---|---|---|
| 12,190,564 | B2 * | 1/2025 | Ji | G06N 3/098 |
| 12,613,943 | B1 * | 4/2026 | Bhat | G06F 21/16 |

(Continued)

OTHER PUBLICATIONS

Chaudary et al. "Differential Morph Face Detection Using Discriminative Wavelet Sub-Bands", IEEE/CVF Conference on CVPR Workshops, 2021,pp. 1425-1434 (Year: 2021).

(Continued)

*Primary Examiner* — Ming Y Hon
(74) *Attorney, Agent, or Firm* — Kevin McDermott, Esq.

(57) ABSTRACT

A method for enhancing detection of morphed biometric modality data is provided that includes the steps of receiving, by an electronic device, biometric modality data of a person and extracting, using a trained machine learning model operated by the electronic device, high dimensionality feature vectors from the received biometric modality data. Moreover, the method includes the steps of generating a distribution from the high-dimensionality feature vectors, calculating a deviation between the generated distribution and a corresponding record high-dimensionality feature vector distribution of the person, and comparing the calculated deviation against a threshold deviation value. In response to determining the deviation satisfies the threshold deviation value, the method includes the step of determining the received biometric modality data was morphed.

18 Claims, 8 Drawing Sheets

(51) Int. Cl.

*G06V 40/16* (2022.01)
*G06V 10/70* (2022.01)

(56) References Cited

U.S. PATENT DOCUMENTS

| | | | | |
|---|---|---|---|---|
| 2012/0219176 | A1* | 8/2012 | Guan | G06V 40/28<br>382/103 |
| 2020/0175290 | A1* | 6/2020 | Raja | G06F 21/32 |
| 2020/0218885 | A1* | 7/2020 | Budhrani | G06V 40/45 |
| 2021/0117529 | A1* | 4/2021 | Zamora Martínez | G06F 21/32 |
| 2021/0182585 | A1* | 6/2021 | Ionita | G06V 40/166 |
| 2022/0121884 | A1* | 4/2022 | Zadeh | G06N 3/006 |
| 2022/0189226 | A1* | 6/2022 | Johnson | G07C 9/10 |
| 2023/0206104 | A1* | 6/2023 | Rab | G06N 10/00<br>716/100 |
| 2023/0206605 | A1* | 6/2023 | Aoki | G06V 10/28<br>382/115 |
| 2023/0308198 | A1* | 9/2023 | Sakai | H04B 17/309 |
| 2024/0119576 | A1* | 4/2024 | Qiu | G06N 3/045 |
| 2024/0127395 | A1* | 4/2024 | Nakatsugawa | G06T 1/0007 |
| 2024/0177519 | A1* | 5/2024 | Singh | G06V 10/761 |
| 2024/0311670 | A1* | 9/2024 | Senokosov | G06N 10/20 |
| 2025/0014388 | A1* | 1/2025 | Venkataraman | G06V 10/20 |
| 2026/0099845 | A1* | 4/2026 | Peirce | G06Q 20/40145 |

OTHER PUBLICATIONS

Venkatesh et al. "Face Morphing Attack Generation and Detection: A Comprehensive Survey", IEEE Transitions on Technology and Society, vol. 2, No. 3, Sep. 2021.

* cited by examiner

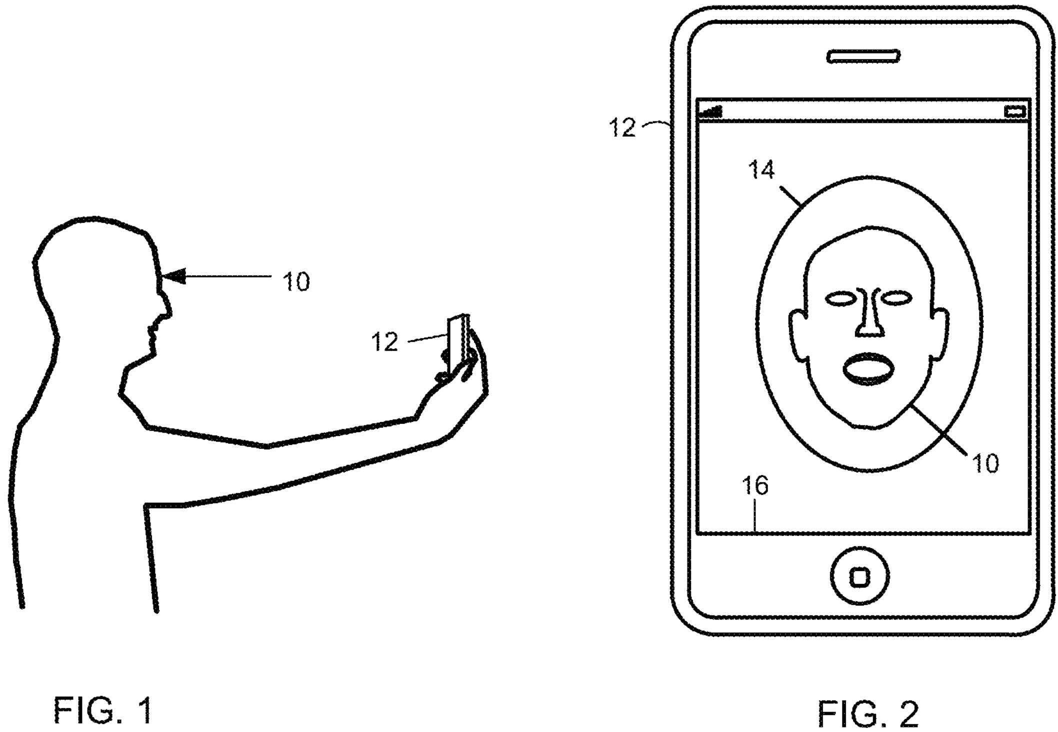
FIG. 1
FIG. 2
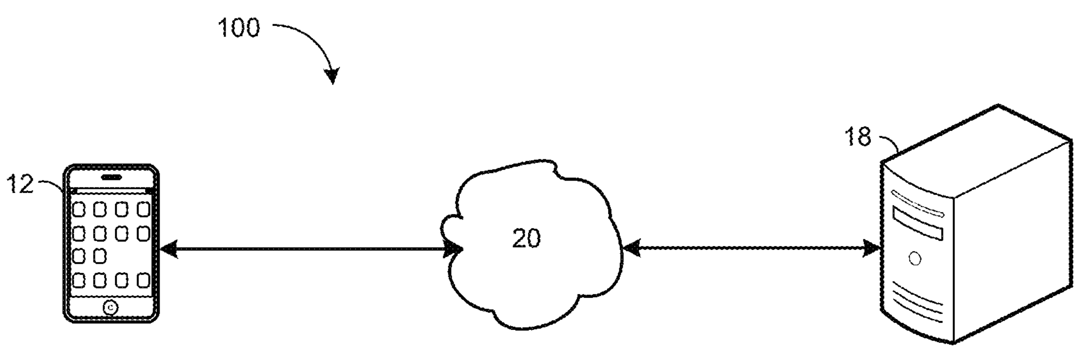
FIG. 3

ELECTRONIC DEVICE AND METHOD FOR ENHANCING DETECTION OF MORPHED BIOMETRIC MODALITY DATA

CROSS REFERENCE TO RELATED APPLICATIONS

This is a continuation application of U.S. patent application Ser. No. 18/960,368, filed Nov. 26, 2024, the disclosure of which is incorporated herein by reference.

BACKGROUND OF THE INVENTION

This invention relates generally to biometric modality data, and more particularly, to an electronic device and methods for enhancing detection of morphed biometric modality data.

Known biometric authentication methods may be used in issuing government-issued identity documents, in accessing secure facilities, and in authenticating consumer devices. However, such methods have been known to be vulnerable to morphing attacks which are becoming increasingly difficult to detect.

A morphing attack occurs when biometric data, for example, a facial image is manipulated to blend biometric features of two or more different people, such that each person can be successfully biometrically authenticated using the manipulated image. Successful morphing attacks can lead to unauthorized access to confidential data or unauthorized entry into secure areas. Morphing attacks can take place while remotely applying for an identity document like a passport or a driver's license. Image data submissions required for the identity document may be unsupervised which enables legitimately submitting manipulated or morphed images to obtain a fraudulent identification document that is otherwise genuine.

Known methods for detecting morphing attacks focus on static analysis of facial images so are not suited for detecting morphing attacks that involve dynamic elements such as facial expressions or behavioral patterns. Moreover, these known methods are typically unable to defend against adversarial attacks because models used in these methods lack the training required to recognize morphed image data. As a result, known methods are vulnerable to adversarial manipulations and unable to adequately detect artifacts generated by morphing.

Printed and digitized images can include artifacts imparted to the image by a printer or digitizing device, respectively. It is known that attackers can exploit these artifacts to disguise artifacts imparted by morphing because there is no robust method to detect or separate artifacts imparted by printers and imaging devices from those imparted by morphing.

Modern facial recognition systems focus on static images or video frames, making them ill-equipped to identify attacks that exploit temporal aspects of facial recognition, such as morphing video sequences or altered micro-expressions. Morphing that occurs over time or that subtly alters facial behavior can evade current detection methods.

Known multi-modal biometric authentication methods lack effective cross-verification capabilities which leaves them vulnerable to attacks that morph only one modality or create inconsistencies between different biometric data points. Current systems fail to address this cross-modality threat adequately.

In view of the above, it can be seen that known methods of detecting artifacts generated by morphing and known methods of biometric authentication are susceptible to morphing attacks that can compromise, for example, security and sensitive data.

Thus, it Would Be Advantageous and an improvement over the relevant technology to provide a method, an electronic device, and a computer-readable recording medium capable of detecting morphing attacks that involve dynamic elements, defending against adversarial attacks, detecting or separating artifacts imparted by printers and imaging devices from those imparted by morphing, identifying attacks that exploit temporal aspects of facial recognition, and effectively identifying cross-verification morphing attacks to thus enhance detection of morphed biometric modality data.

BRIEF DESCRIPTION OF THE INVENTION

In one aspect of the present disclosure, a method for enhancing detection of morphed biometric modality data is provided that includes the steps of receiving, by an electronic device, biometric modality data of a person and extracting, using a trained machine learning model operated by the electronic device, high dimensionality feature vectors from the received biometric modality data. Moreover, the method includes the steps of generating a distribution from the high-dimensionality feature vectors, calculating a deviation between the generated distribution and a corresponding record high-dimensionality feature vector distribution of the person, and comparing the calculated deviation against a threshold deviation value. In response to determining the deviation satisfies the threshold deviation value, the method includes the step of determining the received biometric modality data was morphed.

In one embodiment of the present disclosure, the biometric modality data is a digitized facial image of the person, and the method further includes extracting a unique sensor noise pattern from the digitized image. The unique sensor noise pattern imparted to the image by an imaging device that created the digitized image from a printed image. Moreover, the method includes comparing the extracted unique sensor noise pattern against unique sensor noise patterns of different imaging devices to determine whether there is an inconsistency between the extracted noise pattern and noise patterns of the different imaging devices. Furthermore, the method includes decomposing, using wavelet transforms operated by the electronic device, the digitized image into high and low-frequency bands, and determining whether the high-frequency bands include artifacts indicative of morphing. In response to determining an inconsistency between the extracted unique sensor noise patterns and the unique sensor noise pattern of at least one different imaging device or determining an artifact indicative of morphing is in the high-frequency bands, the methos determines the digitized facial image was morphed.

In yet another embodiment of the present disclosure, the received biometric modality data is facial image data in a video including frames. Each frame includes a facial image of the person. The method further includes analyzing optical flow and facial action unit patterns between sequential frames to detect unnatural movements of the person or inconsistencies in micro expressions of the person that can result from morphing. In response to detecting unnatural movements or inconsistencies in micro expressions of the person, the method determines the facial images in the video were morphed.

In yet another embodiment of the present disclosure, the received biometric modality data includes data for a plurality of different biometric modalities. The method further includes analyzing the received data for each biometric modality using a different machine learning model trained for a respective biometric modality to detect inconsistencies in the received data for each biometric modality. In response to detecting an inconsistency in the data of at least one of the different biometric modalities, the method determines the received data for each biometric modality was morphed.

In yet another embodiment of the present disclosure, the facial image in each frame includes facial landmarks and the method further includes calculating geometric relationships between the facial landmarks in each image and comparing the calculated geometric relationships against corresponding record facial geometric relationships for the person. In response to detecting a difference between the calculated and record geometric relationships, the method determines the facial images in the video were morphed.

In yet another embodiment of the present disclosure, the method further includes generating fraudulent biometric modality data. The fraudulent biometric modality data is morphed. The method also includes retraining the trained machine learning model using the fraudulent biometric modality data.

In yet another embodiment of the present disclosure, the calculating step includes calculating two-dimensional and three-dimensional geometric relationships between facial landmarks.

In yet another embodiment of the present disclosure, the inconsistencies in micro expressions of the person are detected by using temporal difference analysis or motion vector analysis to detect micro expressions in the facial images of the person. The method further includes determining whether any detected micro expressions are anomalies indicative of morphing.

Another aspect of the present disclosure provides a non-transitory computer-readable recording medium in an electronic device for enhancing detection of morphed biometric modality data. The non-transitory computer-readable recording medium stores instructions which when executed by a hardware processor, performs the steps of the methods described above.

In another aspect of the present disclosure, an electronic device for enhancing detection of morphed biometric modality data is provided that includes a processor and a memory configured to store data. The electronic device is associated with a network and the memory is in communication with the processor and has instructions stored thereon. The instructions which, when read and executed by the processor, cause the electronic device to receive biometric modality data of a person, extract, using a trained machine learning model, high dimensionality feature vectors from the received biometric modality data, and generate a distribution from the high-dimensionality feature vectors. The instructions which, when read and executed by the processor, further cause the electronic device to calculate a deviation between between the generated distribution and a corresponding record high-dimensionality feature vector distribution of the person and compare the calculated deviation against a threshold deviation value. In response to determining the deviation satisfies the threshold deviation value, the instructions when read and executed by the processor, further cause the electronic device to determine the received biometric modality data was morphed.

In another embodiment of the present disclosure, the biometric modality data is a digitized facial image of the person and the instructions when read and executed by the processor, cause the electronic device to extract unique sensor noise patterns from the digitized image. The unique sensor noise patterns are imparted to the image by an imaging device that created the digitized image from a printed image. Moreover, the instructions when read and executed by the processor, cause the electronic device to compare the extracted unique sensor noise patterns against unique sensor noise patterns of different imaging devices to determine whether there is an inconsistency between the extracted noise pattern and noise patterns of the different imaging devices.

The instructions when read and executed by the processor, further cause the electronic device to compare the extracted unique sensor noise patterns against unique sensor noise patterns of different imaging devices and decompose, using wavelet transforms, the digital image into high and low-frequency bands. Furthermore, the instructions when read and executed by the processor, further cause the electronic device to determine whether the high-frequency bands include artifacts indicative of morphing. In response to determining there is an inconsistency between the extracted unique sensor noise patterns and the unique sensor noise pattern of at least one different imaging device or determining an artifact indicative of morphing is in the high-frequency bands, the instructions when read and executed by the processor, further cause the electronic device to determine the digitized facial image was morphed.

In yet another embodiment of the present disclosure, the received biometric modality data is facial image data in a video including frames. Each frame includes a facial image of the person. The instructions when read and executed by the processor, cause the electronic device to analyze optical flow and facial action unit patterns between sequential frames to detect unnatural movements of the person or inconsistencies in micro expressions of the person that can result from morphing. In response to detecting unnatural movements or inconsistencies in micro expressions, the instructions when read and executed by the processor, further cause the electronic device to determine the facial images in the video were morphed.

In yet another embodiment of the present disclosure, the received biometric modality data includes data for a plurality of different biometric modalities and the instructions when read and executed by the processor, cause the electronic device to analyze the received data for each biometric modality using a different machine learning model trained for a respective biometric modality to detect inconsistencies in the received data for each biometric modality. In response to detecting an inconsistency in the data of at least one of the different biometric modalities, the instructions when read and executed by the processor, further cause the electronic device to determine the received data for each biometric modality was morphed.

In yet another embodiment of the present disclosure, the facial image in each frame includes facial landmarks. The instructions when read and executed by the processor, cause the electronic device to calculate geometric relationships between the facial landmarks in each image, compare the calculated geometric relationships against corresponding record facial geometric relationships for the person, and, in response to detecting a difference between the calculated and record geometric relationships, determine the facial images in the video were morphed.

In yet another embodiment of the present disclosure, the instructions when read and executed by the processor, cause the electronic device to generate fraudulent biometric modality data. The fraudulent biometric modality data is morphed. The instructions, when read and executed by the processor, cause the electronic device to retrain the trained machine learning model using the fraudulent biometric modality data.

In yet another embodiment of the present disclosure, the instructions when read and executed by the processor, cause the electronic device to calculate two-dimensional and three-dimensional geometric relationships between facial landmarks.

In yet another embodiment of the present disclosure, the instructions when read and executed by the processor, cause the electronic device to detect inconsistencies in micro expressions in the facial images of the person using temporal difference analysis or motion vector analysis and determine whether any detected micro expressions are anomalies indicative of morphing.

BRIEF DESCRIPTION OF THE DRAWINGS

FIG. 1 is a side view of a person operating an example electronic device to capture data of a biometric modality from his or herself;

FIG. 2 is a front view of the electronic device displaying an example visual aid and a facial image of the person positioned within the visual aid;

FIG. 3 is a schematic diagram of an example computing system for enhancing detection of morphed biometric modality data according to an embodiment of the present disclosure;

DETAILED DESCRIPTION OF THE INVENTION

Figure 4:
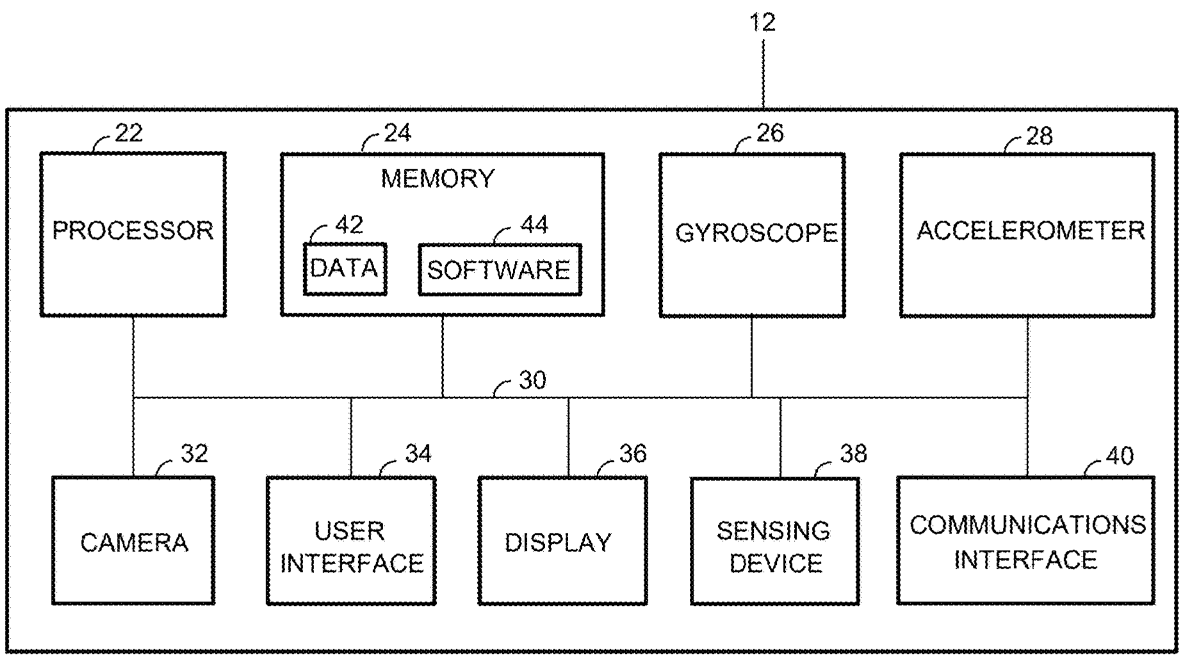
FIG. 4 is a more detailed diagram illustrating the example electronic device used for enhancing detection of morphed biometric modality data according to an embodiment of the present disclosure.

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

FIG. 1 is a side view of a person 10 operating an example electronic device 12 to capture data of a biometric modality from his or herself. The electronic device 12 may be associated with a person who operates the device. The person who is associated with and operates the electronic device 12 can be referred to as a user. Additionally, a user may be any person being authenticated or who provides biometric modality data for any purpose, for example, while remotely applying for an identity document.

FIG. 2 is a front view of the electronic device 12 displaying an example visual aid 14 and a facial image of the person 10 positioned within the visual aid 14. The visual aid 14 may be displayed by the electronic device 12 and functions as a guide that enables users to capture facial image data usable for enhancing user liveness detection and generating trustworthy authentication transaction results. One example of the visual aid 14 is an oval. Other examples of the visual aid 14 include, but are not limited to, a circle, a square, a rectangle, and an outline of the head of the user. Moreover, the visual aid may be any shape defined by lines and curves. However, it is not necessary that the visual aid 14 be displayed by the electronic device 12. The visual aid 14 may alternatively be a part of the electronic device 12 itself. Thus, another example of the visual aid 14 may be a perimeter 16 of the electronic device 12 display screen.

FIG. 3 is a schematic diagram of an example computing system 100 for enhancing detection of morphed biometric modality data according to an embodiment of the present disclosure. As shown in FIG. 3, the main elements of the system 100 include the electronic device 12 and a server 18 communicatively connected via a network 20.

In FIG. 3, the electronic device 12 can be any wireless hand-held consumer electronic device capable of at least downloading applications over the Internet, running applications, capturing and storing data temporarily and/or permanently, and otherwise performing any and all functions described herein by any computer, computer system, server or electronic device included in the system 100. Moreover, the electronic device 12 may alternatively be any type of server or computer implemented as a network server or network computer. Other examples of the electronic device 12 include, but are not limited to, a cellular phone, a tablet computer, a phablet computer, a laptop computer, a camera and any type of hand-held consumer electronic device having wired or wireless networking capabilities capable of performing the functions, methods, and/or algorithms described herein.

The server 18 can be, for example, any type of server or computer implemented as a network server or network computer. The electronic device 12 and the server 18 may each alternatively be referred to as an information system. The server 18 may also alternatively be referred to as an electronic device.

The network 20 may be implemented as a 5G communications network. Alternatively, the network 20 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 20 may also be any type of wired network or a combination of wired and wireless networks.

It is contemplated by the present disclosure that the number of electronic devices 12 and servers 18 is not limited to the number shown in the system 100. Rather, any number of electronic devices 12 and servers 18 may be included in the system 100.

FIG. 4 is a more detailed schematic diagram illustrating the example electronic device 12 used for enhancing detection of morphed biometric modality data, for example, while applying for an identity document according to an embodiment of the present disclosure. The electronic device 12 includes components such as, but not limited to, one or more processors 22, a memory 24, a gyroscope 26, an accelerometer 28, a bus 30, a camera 32, a user interface 34, a display 36, a sensing device 38, and a communications interface 40. General communication between the components in the electronic device 12 is provided via the bus 30.

The processor 22 executes software instructions, or computer programs, stored in the memory 24. It is contemplated by the present disclosure that the number of processors 16 is not limited to the number shown in the electronic device 12. Rather, any number and type of processor(s) 22 may be included in the electronic device 12. As used herein, the term processor is not limited to just those integrated circuits referred to in the art as a processor, but broadly refers to a computer, a microcontroller, a microcomputer, a programmable logic controller, an application specific integrated circuit, a Tensor Processing Unit (TPU), a Graphics Processing Unit (GPU), and any other programmable circuit capable of executing at least a portion of the functions and/or methods described herein. The above examples are not intended to limit in any way the definition and/or meaning of the term "processor."

The memory 24 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 24 may be used to store any type of data 42, for example, data records of people. Each different data record is typically for a different person. The data record for each person may include data such as, but not limited to, the person's biometric modality data, biometric templates, high-dimensionality feature vectors, record high-dimensionality feature vector distributions, facial landmark data, geometric relationships between facial landmarks, and personal data. The biometric modality data may be the digital version of a bona fide printed image, for example, a scan or a digital photo of the printed image. The digital versions of the bona fide images for different people may be included in a dataset stored in the memory 24.

A biometric template can be any type of mathematical representation of biometric modality data. Biometric modality data is the data of a biometric modality of a person. For the methods and systems described herein, the biometric modality is face. However, it is contemplated by the present disclosure that the biometric modality may alternatively be any biometric modality that facilitates detecting morphed biometric modality data as described herein. Examples of other biometric modalities include, but are not limited to, iris, fingerprint, voice, palm, and behavioral patterns. Moreover, the biometric modality may be any combination of these and/or other biometric modalities including, but not limited to, the combination of voice and face and the combination of face and palm. Behavioral patterns include, but are not limited to, typing patterns and the walking gait of a person.

Biometric modality data may be captured in any manner. For example, for face biometric data, the camera 32 may record image data of the face of a person by taking one or more photographs or digital images of the person, or by taking a video of the person. The camera 32 may record a sequence of digital images at irregular or regular intervals. A video is an example of a sequence of digital images being captured at a regular interval. For voice biometric data, the electronic device 12 may record a person speaking.

Captured biometric modality data may be temporarily or permanently stored in the electronic device 12 or in any device capable of communicating with the electronic device 12 via the network 20. Alternatively, the biometric modality data may not be stored. As used herein, capture means to record temporarily or permanently, any data including, for example, biometric modality data of a person.

The term "personal data" as used herein includes any demographic information regarding a person as well as contact information pertinent to the person. Such demographic information includes, but is not limited to, the person's name, age, date of birth, street address, email address, citizenship, marital status, and contact information. Contact information can include devices and methods for contacting the person.

Additionally, the memory 24 can be used to store any type of software 44. As used herein, the term "software" is intended to encompass an executable computer program that exists permanently or temporarily on any non-transitory computer-readable recordable medium that causes the electronic device 12 to perform at least a portion of the functions, methods, and/or algorithms described herein. Application programs are software and include, but are not limited to, operating systems, Internet browser applications, authentication applications, user liveness detection applications, machine learning algorithms (MLA), trained machine learning models, a face tracker application, a feature extraction application, an adversarial attack simulation application, an artifact detection application, a behavioral analysis application, wavelet transforms, a cross-modality application, a cross-modality analysis application, a Gaussian Mixture Model (GMM), and any other software and/or any type of instructions associated with algorithms, processes, or operations for controlling the general functions and operations of the electronic device 12. The software may also include computer programs that implement buffers and use RAM to store temporary data.

Authentication applications enable the electronic device 12 to conduct user verification and identification (1:C) transactions with any type of authentication data, where "C" is a number of candidates. Face tracker applications can extract facial landmark data from captured facial images including sequences of facial images.

Liveness detection applications differentiate between captured data of a biometric modality of a live person and manipulated biometric modality data of a person. Examples of liveness detection include, but are not limited to, analyzing captured data of a biometric modality for eye blink frequency, for replay, for subtle skin texture variations, for depth, for facial structure, and for a pulse. Using liveness detection applications facilitates ensuring that genuine biometric modality data of a person is used, for example, during authentication transactions and while remotely applying for an identity document thus enhancing the accuracy and trustworthiness of authentication transaction results as well as the trustworthiness of, for example, government issued identity documents.

A machine learning algorithm (MLA) may be used to train a machine learning model (MLM) for enhancing detection of morphed biometric modality data. MLMs have parameters which are modified during training to optimize functionality of the models trained using a machine learning algorithm (MLA). The MLM may be retrained using morphed biometric modality data captured, for example, from people applying remotely for identity documents. MLAs include at least classifiers and regressors. Example classifiers are Deep Neural Networks (DNNs), Time Delay Neural Networks (TDNNs), Recurrent Neural Networks (RNNs), Convolutional Neural Networks (CNNs), Residual Networks (ResNets), Generative Adversarial Networks (GANs), transformers, and ensemble learning models.

Convolutional neural networks, for example, may be used to extract high-dimensionality feature vectors from biometric modality data captured, for example, while a person applies remotely for an identity document. High dimensionality feature vectors are numerical representations of biometric modality data that include hundreds or thousands of dimensions. Each dimension corresponds to a distinct feature of the biometric modality. Using high dimensionality feature vectors facilitates the detailed analysis necessary for distinguishing between genuine and morphed biometric modality data.

High dimensionality feature vectors created from facial image data typically range between about 128 and 512 dimensions but have been known to include up to 1,024 dimensions to capture finer details of the face. High dimensionality feature vectors created from iris data typically range between about 200 and 400 dimensions which represent intricate iris patterns. High dimensionality feature vectors created from voice data typically range between about 50 and 600 dimensions which facilitate analyzing the variability in, for example, pitch, tone, and resonance of the voice data. High dimensionality feature vectors created from multi-modal biometric data typically include thousands of dimensions which are necessary to obtain distinct details for each biometric modality.

A Gaussian Mixture Model (GMM), for example, may be used to generate the distribution of the high-dimensionality feature vectors for captured biometric modality data. Any significant deviation of the generated distribution from a record distribution may indicate that the biometric modality data was morphed. A significant deviation between the distribution of captured high-dimensionality feature vectors and the record distribution can indicate that the biometric data likely contains alterations consistent with morphing.

The significance of the deviation can be determined in any manner. For example, the significance may be determined by using a Mahalanobis distance exceeding three (3) standard deviations from the mean distribution of bona fide biometric modality data. As another example, the significance may be determined by calculating a log-likelihood score lower than a preset threshold based on bona fide biometric modality data wherein the threshold can be, for example, −5.0 or lower. As yet another example, the significance may be determined by using a Kullback-Leibler divergence that exceeds a threshold value of, for example, 0.05, which indicates divergence from an expected distribution. As yet another example, the significance may be determined by analyzing structural changes in covariance matrices in which variances exceed a tolerance range of about ten percent. In another example of determining the significance of the deviation, anomaly scores computed by trained anomaly detection models, for example, autoencoders, that fall within the top 5% of known anomaly scores may indicate the deviation is significant. Additionally, the significance of a deviation may be determined by evaluating whether feature-specific deviations surpass threshold values for sensitive biometric dimensions.

Any of the above-described statistical metrics, or any combination of the above-statistical metrics, may be used to determine a threshold derivation value for use in determining whether or not there is a significant deviation between the distribution of captured high-dimensionality feature vectors and a corresponding record distribution.

When a sequence of digital images is captured, the electronic device 12 may extract images from the sequence and assign a time stamp to each extracted image. An application, for example a face tracker application may process the extracted digital images. The face tracker application may extract data from images including, but not limited to, facial landmarks, facial expressions, and the orientation of the face within the image. The extracted data may be analyzed to determine whether the image or images were morphed. For example, the optical flow of facial landmarks may be tracked across sequential video frames to identify unnatural transitions that may be indicative of morphing.

Facial action patterns of the landmarks may also be analyzed. Facial action patterns refer to dynamic changes in facial expressions and movements, analyzed through Action Units (AUs) such as eyebrow raises, lip pursing, and cheek lifts. Unnatural transitions or inconsistencies in these patterns, detected via optical flow analysis or machine learning, may indicate morphing artifacts. Additionally, a Recurrent Neural Network (RNN), for example, may be used to model temporal dependencies to facilitate detecting motion inconsistencies in micro-expressions or facial movements over time.

The extracted data may be stored in the memory 24. The facial landmark data includes data generated by the face tracker application as a result of processing the frames. The generated data includes, but is not limited to, coordinate values for facial landmarks. The coordinate values may include a three-dimensional coordinate value for each different facial landmark. The facial landmarks are identified by the face tracker application on the facial image included in each processed frame. The facial landmarks include, but are not limited to, cheek points, nose points, points on sides of the face, chin points, and points about the eyes and eyebrows.

The facial landmark data may be used to monitor the position of each facial landmark between frames. Additionally, the facial landmark data may be used to calculate geometric relationships between facial landmarks in the same image, for example, the geometric relationships between the tip of the nose and a point on the chin or the distance between the center of the eyes. The calculated geometric relationships can be compared against corresponding record geometric relationships for the person from whom the facial image data was captured. Morphed data often distorts geometric relationships. As a result, any anomaly or difference detected between the calculated and record geometric relationships may indicate the facial image data was morphed.

A temporal differential analysis of the facial landmark data may be conducted to facilitate determining whether any landmarks moved too rapidly between frames which may indicate the sequence of digital images was morphed. Too rapidly can mean moving to a different position within a subsequent frame, but the movement is physically impossible. Moreover, a three-dimensional analysis of each facial landmark may be conducted to facilitate determining whether or not the sequence of digital images was morphed.

When the sequence of digital images includes an audio signal, feature extraction computer programs can process the audio signal to generate a representative feature vector that contains information about the signal. Audio signals can be voice data spoken by a person. Features may be extracted from voice data and analyzed using a trained machine learning model to determine whether the voice data was morphed.

Known methods of biometric authentication have difficulty detecting subtle modifications made to genuine facial images. The subtle modifications are imperceptible to humans. Providing such modified facial images while applying, for example, for an identity document is known as a morphing attack.

An adversarial attack simulation application may be used to retrain morph detecting MLMs to enhance their ability to accurately detect morphed biometric data. For example, morphed biometric data may be generated that is designed to fool a MLM trained to detect morphing. Retraining the MLM with the morphed biometric data enhances the MLMs ability to accurately detect morphed biometric data. The morphed biometric data may be generated using techniques including, for example, Fast Gradient Sign Method (FGSM) and Projected Gradient Descent (PGD).

The process of verifying the identity of a person is known as a verification transaction or an authentication transaction. Generally, during a verification transaction a biometric template is generated from biometric modality data of a person captured during the transaction. Typically, data for a single biometric modality is captured. The generated biometric template is compared against a corresponding record biometric template of the person and a matching score is calculated for the comparison. If the matching score meets or exceeds a threshold score, the identity of the person is verified as true. Alternatively, the captured biometric modality data may be compared against corresponding record biometric modality data to verify the identity of the person.

Multi-modal biometric authentication transaction involves conducting a verification transaction using data of more than one biometric modality of a person. For example, any combination of face, iris, and voice biometric data may be used to authenticate the identity of a person. Morphing attacks conducted against a multi-modal biometric authentication system may manipulate the data of one biometric modality only. However, known biometric multi-modal authentication systems are typically unable to detect such morphing attacks.

The cross-modality application includes multiple machine learning models that are each trained to detect inconsistences within a certain biometric modality. The inconsistencies may be caused by temporal alignment issues between modalities, geometric inconsistencies, and statistical mismatches. Examples of temporal alignment issues include, but are not limited to, delays or asynchrony in facial expressions and voice tone in a video. Examples of geometric inconsistencies include, but are not limited to, facial dimensions failing to match iris crypt patterns or voice tonal features. Examples of statistical mismatches include, but are not limited to, high-dimensionality feature vectors for each modality exhibiting divergent distributions that deviate significantly from expected correlations.

The inconsistencies can be detected, for example, by using separate machine learning models trained for each modality and a cross-modality analysis application that identifies statistical anomalies across modalities. Example machine learning models include, for example, a machine learning model (MLM) trained for detecting inconsistencies in facial image data, another MLM trained for detecting inconsistencies in iris biometric data, and yet another MLM trained for detecting inconsistencies in voice biometric data.

Printers are known to impart artifacts to printed images. Such artifacts include, but are not limited to, streaks, lines, banding patterns, spots, and dots. The artifacts typically vary by printer model and type. Printed images can be digitized by scanning or by taking a digital photograph of the printed image. Scanners and cameras also impart artifacts to digitized images. The scanner artifacts typically relate to the hardware and software of the scanner while the camera artifacts typically relate to Photo-Response Non-Uniformity (PRNU) patterns unique to a sensor in the camera. Artifacts imparted to digital images by scanners and cameras are typically different but can be analyzed using PRNU techniques.

Printed images may be manipulated as part of a morphing attack. For example, a printed image may be manipulated before converting the printed image into a digital image suitable for uploading while remotely applying for an identity document. These manipulations impart artifacts to the printed image which are different than those imparted by scanners and cameras. The artifacts imparted by morphing can result from blending the same facial feature, for example, the faces from two different people, or from compression and resampling the image during morphing.

The artifact detection application facilitates distinguishing between artifacts generated as a result of manipulations associated with morphing and those generated by, for example, scanners, cameras, and printers. The artifact detection application can implement, for example, a PRNU analysis to distinguish between the artifacts. PRNU is a type of sensor pattern noise inherent to digital imaging sensors included in digital cameras and scanners. Each sensor has slight imperfections that cause tiny, unique variations in pixel sensitivity. Each imperfection may be considered a distinguishing characteristic for the corresponding imaging device. Thus, the imaging device used to create the digital image may be identified via the distinguishing characteristics. Any artifacts not associated with the distinguishing characteristics of an imaging device may be the result of manipulation associated with morphing. Additionally, mismatches in imaging device artifacts detected using PRNU may be indicative of morphing. Imaging devices include, but are not limited to, scanners and cameras.

Wavelet transforms can be used to decompose a digital image into multiple frequency bands which facilitate analyzing high and low frequency artifacts in the image. For example, a digital image may be processed by a wavelet transform to decompose the image into high, low and medium frequency artifacts. High-frequency artifacts capture fine details, such as edges and textures, while low-frequency artifacts represent broader, smoother areas of the image. The artifacts imparted to digital images via manipulation associated with morphing are typically high-frequency artifacts. Examples of high-frequency artifacts associated with morphing include, but are not limited to, texture inconsistencies, edge sharpness variations, and pixel level anomalies caused by compression or resampling during morphing. Examples of texture inconsistencies include, but are not limited to, blending irregularities in skin patterns or hairlines. Examples of edge sharpness variations include, but are not limited to, unnatural transitions between facial features.

Wavelet transforms facilitate isolating these high-frequency artifacts to identify unnatural patterns that would not be in an unaltered image. For example, the high-frequency artifacts of a received image may be compared against record high-frequency artifacts of a corresponding bona fide image. Any differences may be the result of morphing. Thus, fine details of the image are checked for manipulation that can be indicative of morphing. Wavelet transforms may generate statistical anomalies, for example, unnatural spectral patterns. Such anomalies may be artifacts indicative of morphing.

Combining PRNU techniques and wavelet transform techniques facilitates providing a robust defense against morphing attacks. More specifically, PRNU techniques facilitate identifying whether the source of an image is authentic and detecting any inconsistencies in sensor noise that might suggest the image was manipulated, while wavelet transforms facilitate detecting high-frequency artifacts commonly found in morphed images. As a result, a digital image created from a printed image can be analyzed for signs of morphing.

The gyroscope 26 and the one or more accelerometers 28 generate data regarding rotation and translation of the electronic device 12 that may be communicated to the processor 22 and the memory 24 via the bus 30. The gyroscope 26 and accelerometer 28 are typically included in electronic devices 12 that are primarily mobile, for example, smart phones and other smart devices, but not in electronic devices 12 that are primarily stationary, for example, servers or personal computers. Thus, the electronic device 12 may alternatively not include the gyroscope 26 or the one or more accelerometers 28 or may not include either.

The camera 32 captures image data. The camera 32 can be one or more imaging devices configured to record image data of at least a portion of the body of a user including any biometric modality of the user while utilizing the electronic device 12. The camera 32 may also capture digital images of printed images. Image data captured using the camera 32 may be used to implement liveness detection techniques based on depth perception. It is contemplated by the present disclosure that image data captured using any other type of imaging device, for example, scanners may additionally, or alternatively, be used to implement liveness detection techniques based on depth perception.

The camera 32 is capable of recording image data under any lighting conditions including infrared light. The camera 32 may be integrated into the electronic device 12 as one or more front-facing cameras and/or one or more rear facing cameras that each incorporates a sensor, for example and without limitation, a CCD or CMOS sensor. Alternatively, the camera 32 can be external to the electronic device 12. As used herein, capture means to record temporarily or permanently, any data including, for example, biometric modality data of a person.

The user interface 34 and the display 36 allow interaction between a user and the electronic device 12. The display 36 may include a visual display screen or monitor that displays information. For example, the display 36 may be a Liquid Crystal Display (LCD), an active-matrix display, plasma display, or cathode ray tube (CRT). The user interface 34 may include a keypad, a keyboard, a mouse, an illuminator, a signal emitter, a microphone, and/or speakers.

Moreover, the user interface 34 and the display 36 may be integrated into a touch screen display. Accordingly, the display 36 may also be used to show a graphical user interface, which can display various data and provide "forms" that include fields that allow for the entry of information by the user. Touching the screen at locations corresponding to the display of a graphical user interface allows the person to interact with the electronic device 12 to enter data, change settings, control functions, etc. Consequently, when the touch screen is touched, the user interface 34 communicates this change to the processor 22, and settings can be changed, or user entered information can be captured and stored in the memory 24. The display 36 may function as an illumination source to apply illumination to an object while image data for the object is captured.

For user interfaces 34 that include an illuminator, the illuminator may project visible light, infrared light or near infrared light on a biometric modality, and the camera 32 may detect reflections of the projected light off the biometric modality. The reflections may be off of any number of points on the biometric modality. The detected reflections may be communicated as reflection data to the processor 22 and the memory 24. The processor 22 may use the reflection data to create at least a three-dimensional model of the biometric modality and a sequence of two-dimensional digital images. For example, the reflections from at least thirty thousand discrete points on the biometric modality may be detected and used to create a three-dimensional model of the biometric modality. Alternatively, or additionally, the camera 32 may include the illuminator.

The sensing device 38 may include Radio Frequency Identification (RFID) components or systems for receiving information from other devices in the system 100 and for transmitting information to other devices in the system 100. The sensing device 38 may alternatively, or additionally, include components with Bluetooth, Near Field Communication (NFC), infrared, or other similar capabilities. Communications between the electronic device 12 of the user and the server 18 may occur via NFC, RFID, Bluetooth or the like only so a network connection from the electronic device 12 is unnecessary.

The communications interface 40 may include various network cards, and circuitry implemented in software and/or hardware to enable wired and/or wireless communications with other electronic devices 12 (not shown) and the server 18 via the network 20. Communications include, for example, conducting cellular telephone calls and accessing the Internet over the network 20. By way of example, the communications interface 40 may be a digital subscriber line (DSL) card or modem, an integrated services digital network (ISDN) card, a cable modem, or a telephone modem to provide a data communication connection to a corresponding type of telephone line. As another example, the communications interface 40 may be a local area network (LAN) card (e.g., for Ethernet.TM. or an Asynchronous Transfer Model (ATM) network) to provide a data communication connection to a compatible LAN. As yet another example, the communications interface 40 may be a wire or a cable connecting the electronic device 12 with a LAN, or with accessories such as, but not limited to, other electronic devices. Further, the communications interface 40 may include peripheral interface devices, such as a Universal Serial Bus (USB) interface, a PCMCIA (Personal Computer Memory Card International Association) interface, and the like.

The communications interface 40 also allows the exchange of information across the network 20. The exchange of information may involve the transmission of radio frequency (RF) signals through an antenna (not shown). Moreover, the exchange of information may be between the electronic device 12 and the server 18, other electronic devices (not shown), and other computer systems (not shown) capable of communicating over the network 20.

Examples of other computer systems (not shown) include computer systems of service providers such as, but not limited to, financial institutions, medical facilities, national security agencies, merchants, and authenticators. The electronic devices (not shown) may be associated with any user or with any type of entity including, but not limited to, commercial and non-commercial entities.

The server 18 may include the same or similar components as described herein with regard to the electronic device 12. The server 18 need not include all the same components described herein with regard to the electronic device 12. For example, the server 18 may not include the gyroscope 26 and/or accelerometer 28. The electronic device 12, server 18 and any other computer devices (not shown) and/or systems (not shown) that may be in the computing system 100 may be implemented in a cloud environment.

A morphing attack occurs when biometric modality data, for example, a facial image is manipulated to blend biometric features of two or more different people, such that each person can be successfully biometrically authenticated using the manipulated facial image. Successful morphing attacks can lead to unauthorized access to confidential data or unauthorized entry into secure areas. Morphing attacks can take place, for example, while remotely applying for an identity document like a passport or a driver's license. Image data submissions required for the identity document may be unsupervised which enables legitimately submitting manipulated or morphed images to obtain a fraudulent identification document that otherwise appears to be genuine.

Known methods of detecting morphing attacks focus on static analysis of facial images so are not suited for detecting morphing attacks that involve dynamic elements such as facial expressions or behavioral patterns. Additionally, these known methods are ill equipped to identify morphing attacks that exploit temporal aspects of facial recognition like morphing video sequences or altered micro expressions. Such known methods are typically unable to defend against adversarial attacks because models used in these methods lack the training required to recognize morphed image data. This lack of training makes known methods of detecting morphing attacks vulnerable to adversarial manipulations and unable to adequately detect image artifacts.

A printed or scanned image includes artifacts imparted to the image by the scanner or printer. It is known that attackers can exploit these artifacts to disguise morphing attacks because there is no robust method to detect or separate artifacts created by manipulation related to morphing.

Multi-modal biometric authentication methods lack effective cross-verification capabilities which leaves them vulnerable to morphing attacks that morph the data of only one modality or create inconsistencies between different biometric data points. Current systems fail to address this cross-modality threat adequately.

To solve the above problems, the electronic device 12 can receive biometric modality data of a person and extract, using a trained machine learning model operated by the electronic device, high dimensionality feature vectors from the received biometric modality data. The electronic device 12 can generate a distribution from the high-dimensionality feature vectors, calculate a derivation between the generated distribution and a corresponding record high-dimensionality feature vector distribution of the person, and compare the calculated deviation against a threshold deviation value. In response to determining the deviation satisfies the threshold deviation value, the electronic device can determine the received biometric modality data was morphed.

Figure 5:
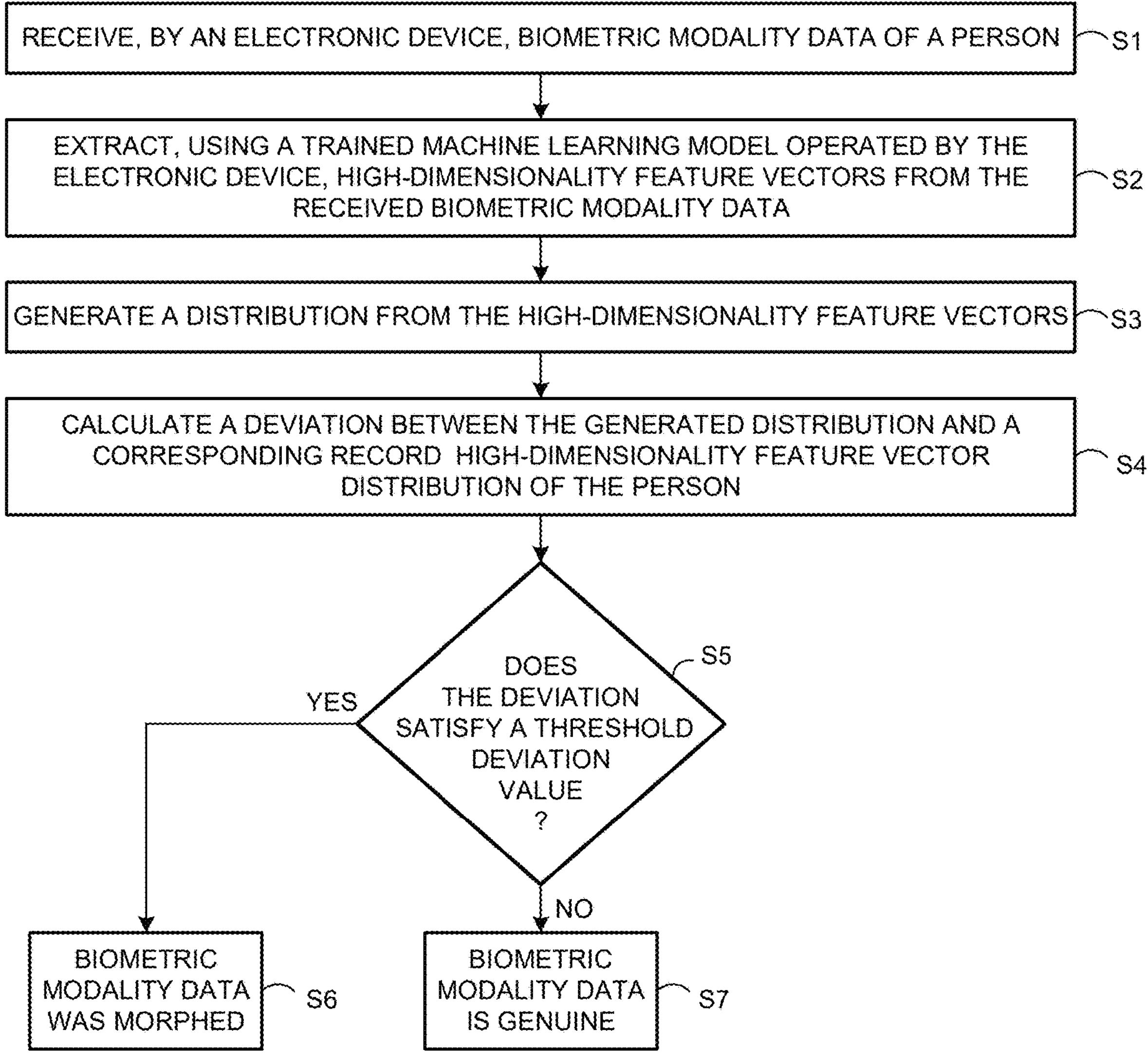
FIG. 5 is a flowchart illustrating an example method and algorithm for enhancing detection of morphed biometric modality data according to an embodiment of the present disclosure.

FIG. 5 is a flowchart illustrating an example method and algorithm for enhancing detection of morphed biometric modality data according to an embodiment of the present disclosure. The electronic device 12 can implement the instructions while a person operating the electronic device 12 remotely applies for, for example, an identity document like a passport or a driver's license. FIG. 5 illustrates example operations performed when the electronic device 12 runs software 44 stored in the memory 24. The person may cause the electronic device 12 to run the software 44 or the electronic device 12 may automatically run the software 44.

In step S1, the software 44 executed by the processor 22 causes the electronic device 12 to receive biometric modality data of a person. For example, the biometric modality data may be captured by another electronic device (not shown) in the system 100 and transmitted to the electronic device 12 via the network 20 for receipt by the electronic device 12. Alternatively, the person may operate the electronic device 12 to capture data of a biometric modality from his or herself.

In step S2, the software 44 executed by the processor 22 causes the electronic device 12 to extract, using a trained machine learning model (MLM) operated by the electronic device 12, high-dimensionality feature vectors from the received biometric modality data. High dimensionality feature vectors are numerical representations of biometric modality data that include hundreds or thousands of dimensions. Each dimension corresponds to a distinct feature of the biometric modality. Using high dimensionality feature vectors facilitates the detailed analysis necessary for distinguishing between genuine and morphed biometric modality data.

Next, in step S3, the software 44 executed by the processor 22 causes the electronic device 12 to generate a distribution from the high-dimensionality feature vectors. The software 44 may be, for example, a Gaussian Mixture Model (GMM) that generates the distribution of the high-dimensionality feature vectors. In step S4, the software 44 executed by the processor 22 causes the electronic device 12 to calculate a deviation between the generated distribution and a corresponding record high-dimensionality feature vector distribution of the person. The deviation between the generated and recorded distributions may be calculated using statistical methods including, but not limited to, likelihood estimation, covariance matrix analysis, or feature-specific thresholds. Likelihood estimation involves calculating a log-likelihood score for the generated distribution and comparing it against a threshold derived from genuine biometric modality data. Covariance matrix analysis involves monitoring structural changes in covariance matrices, such as shifts in eigenvalues or principal components, which may indicate deviations. Feature-specific thresholds analyzing variance shifts greater than fifteen percent in sensitive dimensions, such as interocular distance, nose shape, or other critical biometric features. Such statistical methods may be combined or used individually, depending on the biometric modality and system configuration.

A significant deviation between the generated and record distributions can indicate that the biometric data likely contains manipulations consistent with morphing. The significance of the deviation can be determined using one or more statistical metrics that quantify the difference between the generated and record distributions. For example, the significance may be determined by using a Mahalanobis distance exceeding three (3) standard deviations from the mean distribution of bona fide biometric modality data. As another example, the significance may be determined by calculating a log-likelihood score lower than a preset threshold based on bona fide biometric modality data wherein the threshold can be, for example, −5.0 or lower. As yet another example, the significance may be determined by using a Kullback-Leibler divergence that exceeds a threshold value of, for example, 0.05, which indicates divergence from an expected distribution. As yet another example, the significance may be determined by analyzing structural changes in covariance matrices in which variances exceed a tolerance range of about ten percent. In another example of determining the significance of the deviation, anomaly scores computed by trained anomaly detection models, for example, autoencoders, that fall within the top 5% of known anomaly scores may indicate the deviation is significant. Additionally, the significance of a deviation may be determined by evaluating whether feature-specific deviations surpass threshold values for sensitive biometric dimensions.

Any of the above-described statistical metrics, or any combination of the above-described statistical metrics, may be used to determine a threshold derivation value for use in determining whether or not there is a significant deviation between the distribution of captured high-dimensionality feature vectors and a corresponding record distribution.

A sensitive biometric dimension refers to specific features within the high-dimensional feature vectors that have a significant influence on distinguishing between genuine and morphed biometric data. These dimensions often carry more discriminatory power in biometric authentication systems. For facial recognition examples of sensitive dimensions include, but are not limited to, the interocular distance, nose shape, lip contour, and cheekbone geometry. For biometric authentication based on iris examples of sensitive dimensions include, but are not limited to, unique radial patterns or crypts. For voice authentication examples of sensitive dimensions include, but are not limited to, frequency modulation, pitch, and formant resonance.

In step S5, the software 44 executed by the processor 22 can cause the electronic device 12 to compare the calculated deviation against a threshold deviation value. When the calculated deviation satisfies the threshold deviation value, there is a significant deviation between the generated and record distributions. Next, in step S6, the software 44 executed by the processor 22 causes the electronic device 12 to determine that the biometric modality data was morphed. Otherwise, when the deviation fails to satisfy the threshold deviation value, in step S7, the software 44 executed by the processor 22 causes the electronic device 12 to determine that the biometric modality data is genuine.

The threshold deviation value described herein may be satisfied when the calculated deviation is greater than or equal to the threshold deviation value. Other threshold deviation values may be satisfied when the calculated deviation is less than or equal to the threshold deviation value. Alternatively, the threshold deviation value may include multiple threshold deviation values, each of which is required to be satisfied to satisfy the threshold deviation value.

The information shown in FIG. 6 includes the same information shown in FIG. 5 as described in more detail below. As such, features illustrated in FIG. 6 that are identical to features illustrated in FIG. 5 are identified using the same reference numerals used in FIG. 5.

Figure 6:
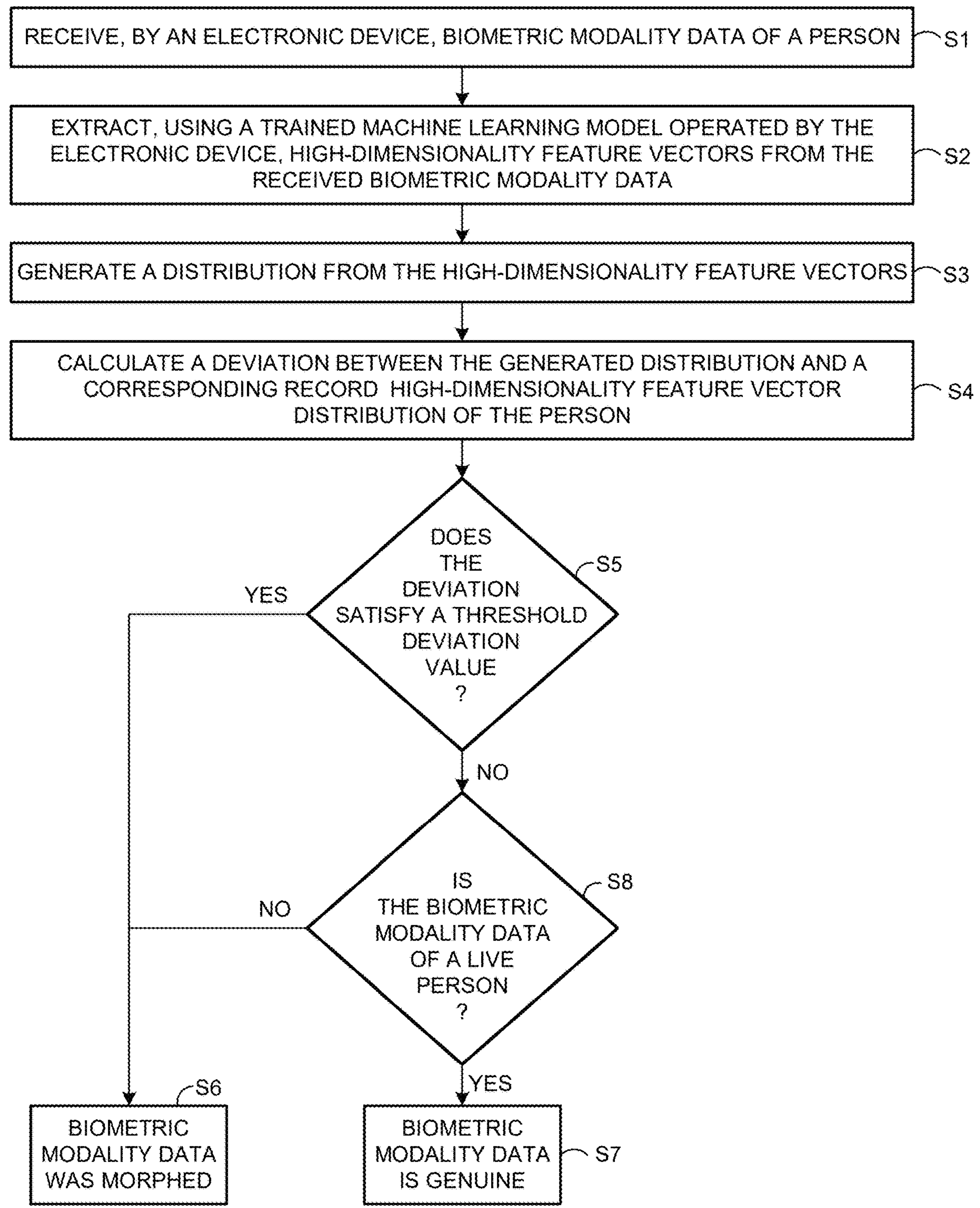
FIG. 6 is a flowchart illustrating the example method and algorithm for enhancing detection of morphed biometric modality data shown in FIG. 5, further including liveness detection.

FIG. 6 is a flowchart illustrating the example method and algorithm for enhancing detection of morphed biometric data shown in FIG. 5, further including liveness detection. Liveness detection includes techniques that differentiate between captured biometric modality data of a live person and manipulated biometric modality data of a person. Examples of liveness detection techniques include, but are not limited to, analyzing captured data of a biometric modality for eye blink frequency, for replay, for subtle skin texture variations, for depth, for facial structure, and for a pulse. Liveness detection techniques facilitate detecting manipulated biometric data and thus facilitate ensuring that genuine data of a biometric modality of a person is used, for example, during authentication transactions and while remotely applying for an identity document. As a result, liveness detection facilitates enhancing the accuracy and trustworthiness of authentication transaction results as well as the accuracy and trustworthiness of, for example, government issued identity documents.

After determining that the calculated deviation fails to satisfy the threshold deviation value, in step S8, the software 44 executed by the processor 22 causes the electronic device 12 to determine whether the biometric modality data is of a live person. For example, the software 44 executed by the processor 22 may cause the electronic device 12 to generate, for example, a confidence score reflecting the likelihood that the received biometric modality data is of a live person. If the confidence score satisfies a liveness threshold value, in step S7, the software 44 executed by the processor 22 causes the electronic device 12 to determine that the received biometric modality data is genuine. However, if the confidence score fails to satisfy the threshold value, in step S6, the software 44 executed by the processor 22 causes the electronic device 12 to determine that the received biometric modality data is fraudulent.

The liveness threshold value described herein may be satisfied when the confidence score is less than or equal to the liveness threshold value. Other liveness threshold values may be satisfied when the confidence score is equal to or greater than the liveness threshold value. Alternatively, the liveness threshold value may include multiple liveness threshold values, each of which is required to be satisfied to satisfy the liveness threshold value.

Figure 7:
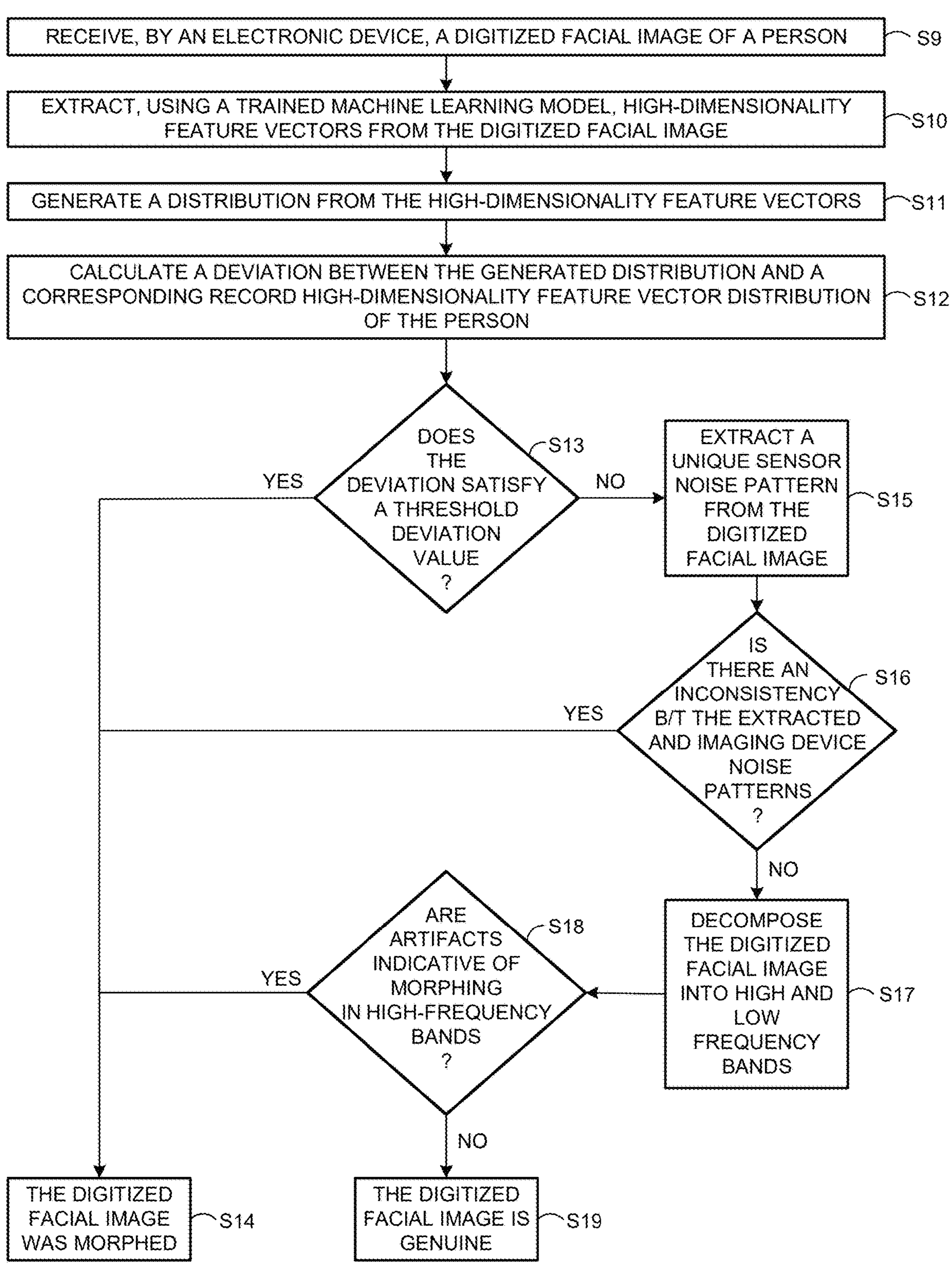
FIG. 7 is a flowchart illustrating another example method and algorithm for enhancing detection of morphed biometric modality data in which the biometric modality data is a digitized facial image of a person.

FIG. 7 is a flowchart illustrating another example method and algorithm for enhancing detection of morphed biometric data according to an embodiment of the present disclosure. This example method is similar to that shown in FIG. 5.

However, the biometric modality data is a digitized facial image of a person and data extracted from the digitized facial image is used to further detect morphing. The digitized image may be created by, for example, using an imaging device to scan or photograph a bona fide printed image that includes a facial image of the person. The electronic device 12 can implement the instructions while a person operating the electronic device 12 remotely applies for, for example, an identity document like a passport or a driver's license. FIG. 7 illustrates example operations performed when the electronic device 12 runs software 44 stored in the memory 24. The person may cause the electronic device 12 to run the software 44 or the electronic device 12 may automatically run the software 44.

Imaging devices include, but are not limited to, scanners and cameras. Imaging devices impart artifacts to digitized images. The artifacts generated by scanners and cameras are typically different but can be analyzed using Photo-Response Non-Uniformity (PRNU) techniques. The imparted artifacts can be considered unique sensor noise patterns of the imaging device.

Printed images may be manipulated as part of a morphing attack. For example, a printed image may be manipulated before converting the printed image into a digital image suitable for uploading, for example, while remotely applying for an identity document. These manipulations impart artifacts to the printed image which are different than the artifacts imparted by imaging devices. The artifacts imparted by morphing can result from blending the same feature, for example, the faces from two different people, or from compression and resampling the image during morphing.

In step S9, the software 44 executed by the processor 22 causes the electronic device 12 to receive a digitized facial image of a person. The digitized facial image may be captured by an imaging device included in another electronic device (not shown) in the system 100 and transmitted to the electronic device 12 via the network 20 for receipt by the electronic device 12. Alternatively, the person may operate, for example, the camera 32 in the electronic device 12 to capture a digitized facial image data of his or herself.

In step S10, the software 44 executed by the processor 22 causes the electronic device 12 to extract, using a trained machine learning model (MLM) operated by the electronic device 12, high-dimensionality feature vectors from the received digitized facial image. Next, in step S11, the software 44 executed by the processor 22 causes the electronic device 12 to generate a distribution from the high-dimensionality feature vectors. In step S12, the software 44 executed by the processor 22 causes the electronic device 12 to calculate a deviation between the generated distribution and a corresponding record high-dimensionality feature vector distribution of the person. In step S13, the software 44 executed by the processor 22 causes the electronic device 12 to compare the calculated deviation against a threshold deviation value. When the calculated deviation satisfies the threshold deviation value, there is a significant deviation between the generated and record distributions.

Next, in step S14, the software 44 executed by the processor 22 causes the electronic device 12 to determine that the digitized facial image was morphed. Otherwise, when the deviation fails to satisfy the threshold deviation value, in step S15, the software 44 executed by the processor 22 causes the electronic device 12 to extract unique sensor noise patterns from the digitized facial image. The sensor noise patterns may be artifacts generated by, for example, imaging devices.

Next, in step S16, the software 44 executed by the processor 22 causes the electronic device 12 to determine if there is an inconsistency between the extracted noise patterns and noise patterns of imaging devices. The noise patterns are patterns created by the artifacts. The software 44 executed by the processor 22 can cause the electronic device 12 to implement, for example, a PRNU analysis to distinguish between different types of artifacts. PRNU detects sensor pattern noise inherent to digital imaging sensors included in imaging devices. Each sensor has slight imperfections that cause tiny, unique variations in pixel sensitivity. Each imperfection may be considered a distinguishing characteristic for the corresponding imaging device. Thus, the imaging device used to create the digital image may be identified via the distinguishing characteristics. Any artifacts not associated with the distinguishing characteristics of an imaging device may be the result of manipulation related to morphing. As a result, specific types of artifacts commonly introduced by morphing are facilitated to be detected. For example, inconsistencies in edge sharpness, texture blending, or pixel alignment might suggest that an image has been morphed.

When there is an inconsistency between the extracted and imaging device patterns, in step S14, the software 44 executed by the processor 22 causes the electronic device 12 to determine that the digitized facial image was morphed. Otherwise, in step S17, the software 44 executed by the processor 22 causes the electronic device 12 to decompose the digital facial image into multiple frequency bands which facilitates analyzing high and low frequency artifacts in the digital facial image. The artifacts imparted to digital images via manipulation associated with morphing are typically high-frequency artifacts and include, for example, unnatural spectral patterns. The software 44 for decomposing the digitized facial image may be, for example, a Wavelet transform.

In step S18, the software 44 executed by the processor 22 causes the electronic device 12 to determine whether any artifacts indicative of morphing are in the high-frequency bands. The high-frequency artifacts can be isolated to identify unnatural patterns that would not be in an unaltered digitized image. For example, the high-frequency artifacts of a digitized facial image may be compared against the high-frequency artifacts of a bona fide digitized facial image. Any differences may be the result of morphing and thus indicate that the high-frequency bands include artifacts indicative of morphing. Examples of high-frequency artifacts associated with morphing include, but are not limited to, texture inconsistencies, edge sharpness variations, and pixel level anomalies caused by compression or resampling during morphing. Examples of texture inconsistencies include, but are not limited to, blending irregularities in skin patterns or hairlines. Examples of edge sharpness variations include, but are not limited to, unnatural transitions between facial features.

When the high-frequency bands include artifacts indicative of morphing, in step S14, the software 44 executed by the processor 22 causes the electronic device 12 to determine that the digitized facial image was morphed. Otherwise, when the high-frequency bands do not include artifacts indicative of morphing, in step S19, the software 44 executed by the processor 22 causes the electronic device 12 to determine that the digitized facial image is genuine.

It is contemplated by the present disclosure that combining PRNU techniques and wavelet transform techniques facilitates providing a robust defense against morphing attacks. More specifically, PRNU techniques facilitate identifying whether the source of an image is authentic and detects any inconsistencies in the sensor noise that might suggest it was manipulated, while wavelet transforms facilitate detecting high-frequency artifacts commonly found in morphed images. As a result, a digital image created by scanning or photographing a printed image can be analyzed for signs of morphing, ensuring that both the source and fine details of the image are checked for manipulation and thus morphing.

Figure 8:
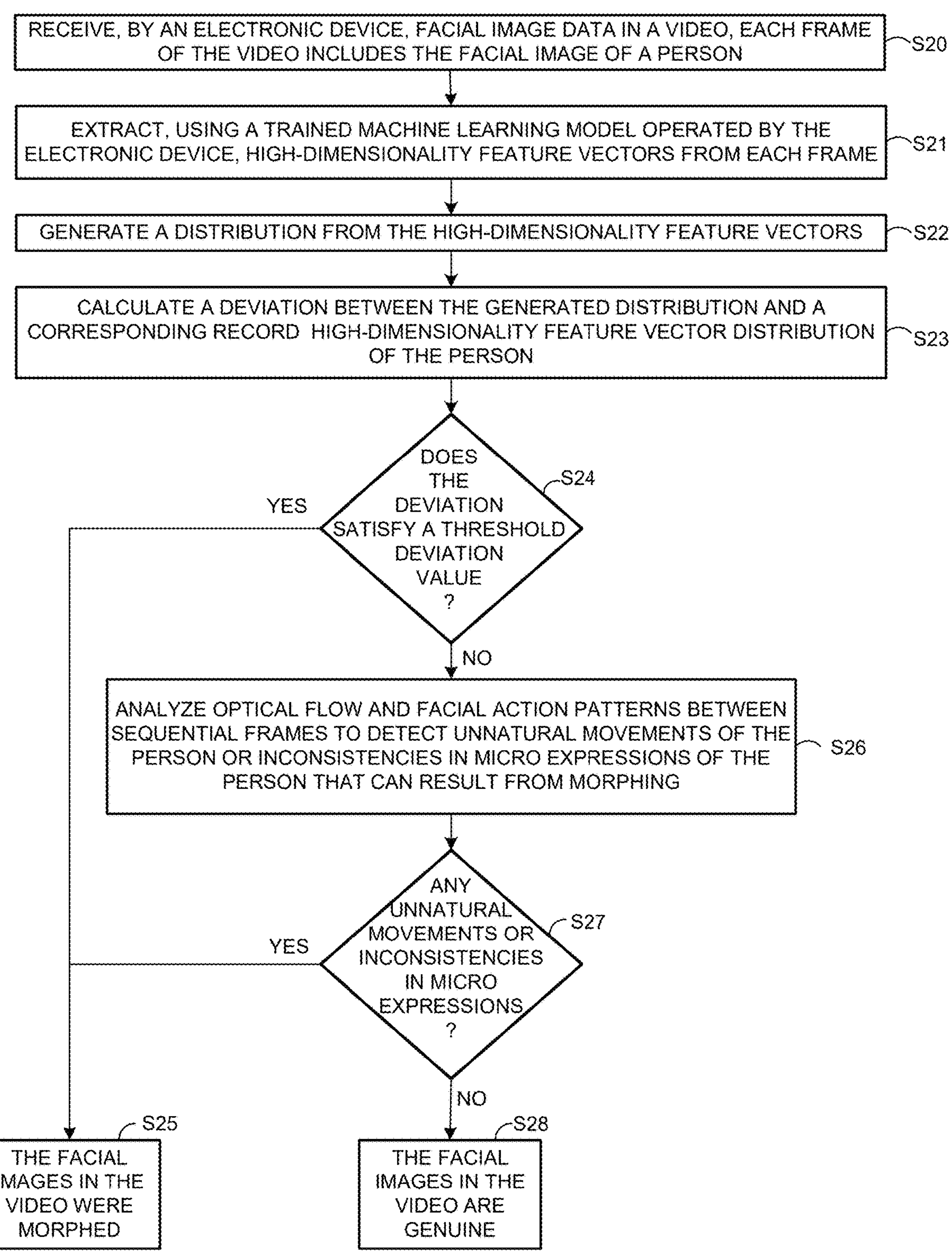
FIG. 8 is a flowchart illustrating yet another example method and algorithm for enhancing detection of morphed biometric modality data in which the biometric modality data is facial image data in a video.

FIG. 8 is a flowchart illustrating another example method and algorithm for enhancing detection of morphed biometric data according to an embodiment of the present disclosure. This example method is similar to that shown in FIG. 5. However, the biometric modality data is facial image data in a video. The video includes frames and each frame includes the facial image of a person. The electronic device 12 can implement the instructions while a person operating the electronic device 12 remotely applies for, for example, an identity document like a passport or a driver's license. FIG. 8 illustrates example operations performed when the electronic device 12 runs software 44 stored in the memory 24. The person may cause the electronic device 12 to run the software 44 or the electronic device 12 may automatically run the software 44.

In step S20, the software 44 executed by the processor 22 causes the electronic device 12 to receive facial image data in a video. The video may be captured by an imaging device included in another electronic device (not shown) in the system 100 and transmitted to the electronic device 12 via the network 20 for receipt by the electronic device 12. Alternatively, the person may operate, for example, the camera 32 in the electronic device 12 to capture the video.

The video includes frames and each frame includes the facial image of a person. Images may be extracted from the video and a time stamp may be assigned to each extracted image. Data may be extracted from the images, for example, facial landmarks, facial expressions, and the orientation of the face within the image. The extracted data may be analyzed to determine whether one or more images in the sequence was morphed. For example, the optical flow of facial landmarks may be tracked across sequential video frames to identify unnatural transitions that may be indicative of morphing. Additionally, temporal dependencies may be modeled to facilitate detecting motion inconsistencies in micro-expressions or facial movements over time.

In step S21, the software 44 executed by the processor 22 causes the electronic device 12 to extract, using a trained machine learning model (MLM) operated by the electronic device 12, high-dimensionality feature vectors from the received facial images. Next, in step S22, the software 44 executed by the processor 22 causes the electronic device 12 to generate a distribution from the high-dimensionality feature vectors. In step S23, the software 44 executed by the processor 22 causes the electronic device 12 to calculate a deviation between the generated distribution and a corresponding record high-dimensionality feature vector distribution of the person.

In step S24, the software 44 executed by the processor 22 causes the electronic device 12 to compare the calculated deviation against a threshold deviation value. When the calculated deviation satisfies the threshold deviation value, there is a significant deviation between the generated and record distributions.

Next, in step S25, the software 44 executed by the processor 22 causes the electronic device 12 to determine that the facial images in the video were morphed. Otherwise, when the deviation fails to satisfy the threshold deviation value, in step S26, the software 44 executed by the processor 22 causes the electronic device 12 to analyze optical flow and facial action patterns between sequential frames to detect unnatural movements of the person or inconsistencies in micro expressions of the person that can result from morphing.

In step S27, the software 44 executed by the processor 22 causes the electronic device 12 to determine whether any unnatural movements or inconsistencies in micro expressions were detected. If so, in step S25, the software 44 executed by the processor 22 causes the electronic device 12 to determine that the facial images in the video were morphed. Otherwise, in step S28, the software 44 executed by the processor 22 causes the electronic device 12 to determine that the facial images in the video are genuine.

Figure 9:
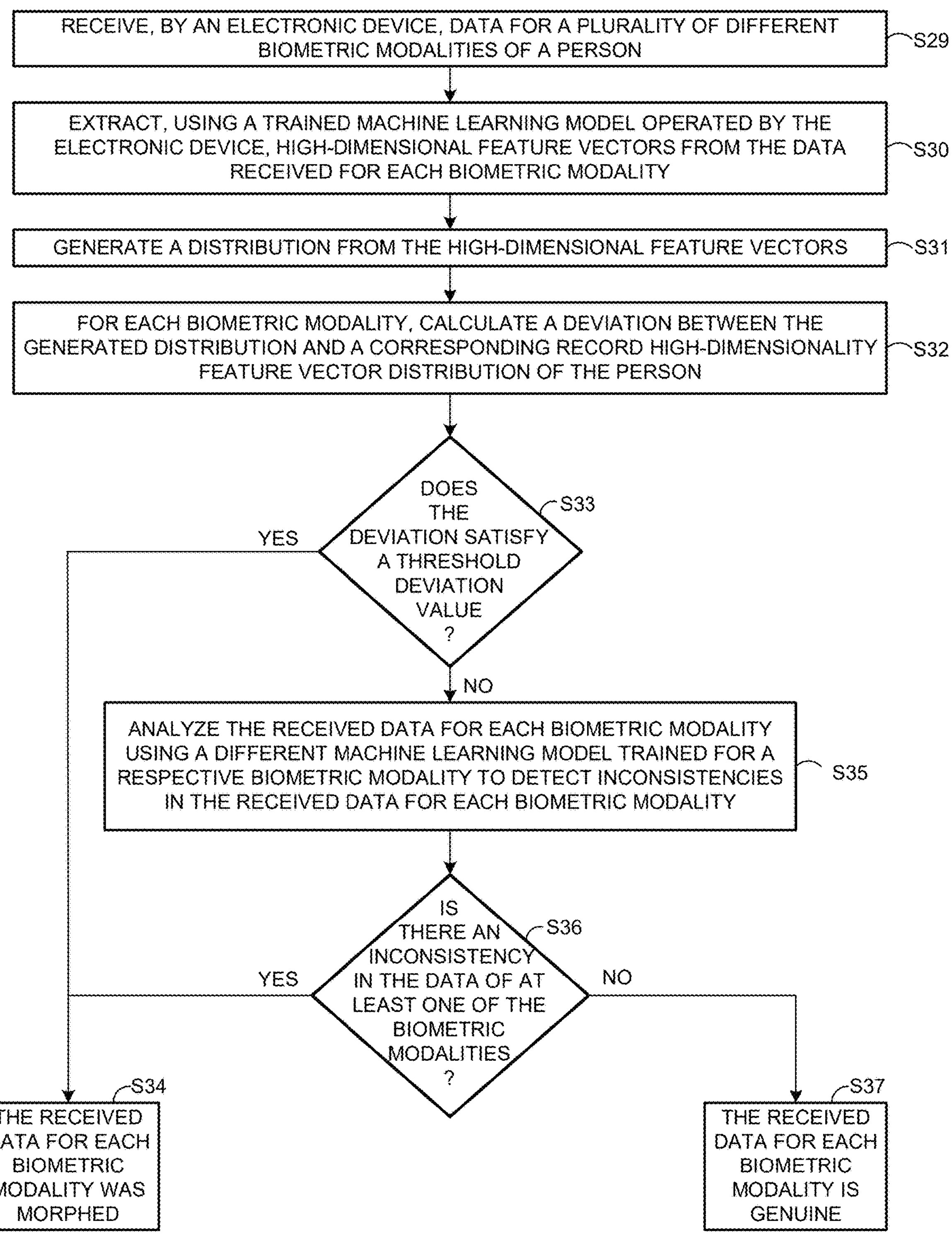
FIG. 9 is a flowchart illustrating yet another example method and algorithm for enhancing detection of morphed biometric modality data in which the biometric modality data includes data for a plurality of biometric modalities.

FIG. 9 is a flowchart illustrating another example method and algorithm for enhancing detection of morphed biometric data according to an embodiment of the present disclosure. This example method is similar to that shown in FIG. 5. However, the biometric modality data includes data for a plurality of different biometric modalities of a person. The electronic device 12 can implement the instructions while a person operating the electronic device 12 remotely applies for, for example, an identity document like a passport or a driver's license. FIG. 9 illustrates example operations performed when the electronic device 12 runs software 44 stored in the memory 24. The person may cause the electronic device 12 to run the software 44 or the electronic device 12 may automatically run the software 44.

In step S29, the software 44 executed by the processor 22 causes the electronic device 12 to receive data for a plurality of different biometric modalities of a person. For example, the data for each different biometric modality may be captured by one or more other electronic devices (not shown) in the system 100 and transmitted to the electronic device 12 via the network 20 for receipt by the electronic device 12. Alternatively, the person may operate the electronic device 12 to capture data of the biometric modalities from his or herself.

In step S30, the software 44 executed by the processor 22 causes the electronic device 12 to extract, using a trained machine learning model (MLM) operated by the electronic device 12, high-dimensionality feature vectors from the data of each different biometric modality. Next, in step S31, the software 44 executed by the processor 22 causes the electronic device 12 to generate a distribution from the high-dimensionality feature vectors. A different distribution is calculated for each different biometric modality from the high-dimensionality feature vectors extracted from the respective biometric modality. In step S32, the software 44 executed by the processor 22 causes the electronic device 12 to compare, for each different biometric modality, the respective distribution against a corresponding record high-dimensionality feature vector distribution of the person.

In step S33, the software 44 executed by the processor 22 causes the electronic device 12 to compare the calculated deviation against a threshold deviation value. When the calculated deviation satisfies the threshold deviation value, there is a significant deviation between the generated and record distributions.

Next, in step S34, the software 44 executed by the processor 22 causes the electronic device 12 to determine that the received data for each biometric modality was morphed. Otherwise, when the calculated deviation fails to satisfy the threshold deviation value, in step S35, the software 44 executed by the processor 22 causes the electronic device 12 to analyze the received data for each biometric modality using a different machine learning model (MLM). Each different MLM is trained for a respective biometric modality to detect inconsistencies in the received data for the respective biometric modality.

Next, in step S36, the software 44 executed by the processor 22 causes the electronic device 12 to determine if there is an inconsistency in the data for any of the different biometric modalities. If so, in step S34, the software 44 executed by the processor 22 causes the electronic device 12 to determine that the data received for each biometric modality was morphed. Otherwise, in step S37, the software 44 executed by the processor 22 causes the electronic device 12 to determine that the data received for each biometric modality is genuine.

Figure 10:
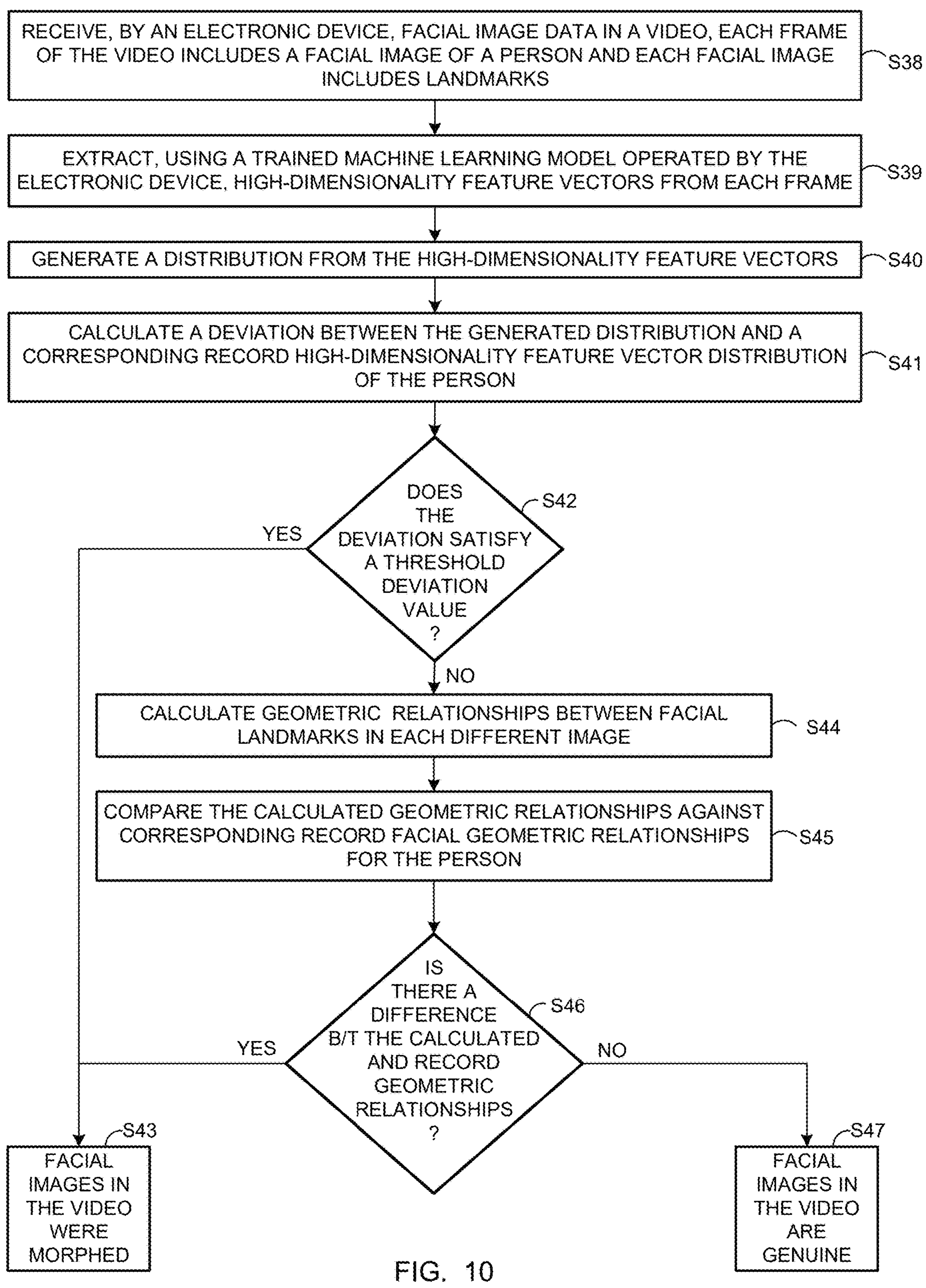
FIG. 10 is a flowchart illustrating yet another example method and algorithm for enhancing detection of morphed biometric modality data in which the biometric modality data is facial image data in a video.

FIG. 10 is a flowchart illustrating another example method and algorithm for enhancing detection of morphed biometric data according to an embodiment of the present disclosure. This example method is similar to that shown in FIG. 5. However, the biometric modality data is a video in which each frame includes a facial image of a person. The facial images include landmarks. The electronic device 12 can implement the instructions while a person operating the electronic device 12 remotely applies for, for example, an identity document like a passport or a driver's license. FIG. 10 illustrates example operations performed when the electronic device 12 runs software 44 stored in the memory 24. The person may cause the electronic device 12 to run the software 44 or the electronic device 12 may automatically run the software 44.

In step S38, the software 44 executed by the processor 22 causes the electronic device 12 to receive facial image data in a video in which each frame includes a facial image of a person. For example, the video may be captured by another electronic device (not shown) in the system 100 and transmitted to the electronic device 12 via the network 20 for receipt by the electronic device 12. Alternatively, the person may operate the electronic device 12 to capture data of the biometric modalities from his or herself.

In step S39, the software 44 executed by the processor 22 causes the electronic device 12 to extract, using a trained machine learning model (MLM) operated by the electronic device 12, high-dimensionality feature vectors from each image in the video. Next, in step S40, the software 44 executed by the processor 22 causes the electronic device 12 to generate a distribution from the high-dimensionality feature vectors. In step S41, the software 44 executed by the processor 22 causes the electronic device 12 to calculate a deviation value between the generated distribution and a corresponding record high-dimensionality feature vector distribution of the person.

In step S42, the software 44 executed by the processor 22 causes the electronic device 12 to compare the calculated deviation against a threshold deviation value. When the calculated deviation satisfies the threshold deviation value, there is a significant deviation between the generated and record distributions.

Next, in step S43, the software 44 executed by the processor 22 causes the electronic device 12 to determine that the received data for each biometric modality was morphed. Otherwise, when the calculated deviation fails to satisfy the threshold deviation value, in step S44, the software 44 executed by the processor 22 causes the electronic device 12 to calculate geometric relationships between facial landmarks in each different image.

Facial landmark data includes data generated by, for example, a face tracker application as a result of processing the frames. The generated data includes, but is not limited to, coordinate values for the facial landmarks. The coordinate values may include two and three-dimensional coordinate values for each different facial landmark. The facial landmarks are identified by the face tracker application on the facial image included in each processed frame. The facial landmarks include, but are not limited to, cheek points, nose points, points on sides of the face, chin points, and points about the eyes and eyebrows. The facial landmark data may be used to monitor the position of each facial landmark between frames. Additionally, the facial landmark data may be used to calculate geometric relationships between facial landmarks, for example, between the tip of the nose and a point on the chin or between the eyes.

In step S45, the software 44 executed by the processor 22 causes the electronic device 12 to compare the calculated geometric relationships against corresponding record facial geometric relationships for the person. Morphed data often distorts geometric relationships. As a result, anomalies detected between the calculated and corresponding record geometric relationships may indicate the facial image data was morphed. Accordingly, in step S46, the software 44 executed by the processor 22 causes the electronic device 12 to determine whether there is a difference between the calculated and record geometric relationships. If so, in step S43, the software 44 executed by the processor 22 causes the electronic device 12 to determine that the facial images in the video were morphed. Otherwise, in step S47, the software 44 executed by the processor 22 causes the electronic device 12 to determine that the facial images in the video are genuine.

Although differences in geometric relationships are used to detect morphed image data in the example algorithm and method described with regard to FIG. 10, it is contemplated by the present disclosure that additionally, or alternatively, temporal differential analysis of the facial landmarks may be conducted to facilitate determining whether any facial landmarks moved too rapidly between frames which may indicate the sequence of digital images was morphed. Too rapidly can mean moving to a different position within a subsequent frame, but the movement is physically impossible. Additionally, or alternatively, a three-dimensional analysis of each facial landmark may be conducted to facilitate determining whether or not the sequence of digital images was morphed.

It is contemplated by the present disclosure that each embodiment of the methods and algorithms for enhancing detection of morphed biometric data described herein may be modified to include determining whether the biometric modality data is of a live person using, for example, the techniques described herein with regard to FIG. 6.

Using the methods and algorithms for enhancing detection of morphed biometric data described herein facilitates detecting morphing attacks that involve dynamic elements, defending against adversarial attacks, detecting or separating artifacts imparted by printers and imaging devices from those imparted by morphing, identifying attacks that exploit temporal aspects of facial recognition, and effectively identifying cross-verification morphing attacks to thus enhance detection of morphed biometric modality data. As a result, the accuracy and trustworthiness of verification transaction results as well as the accuracy and trustworthiness of identity documents are facilitated to be enhanced.

The example methods and algorithms described herein may be conducted entirely by the electronic device 12, or partly by the electronic device 12 and partly by the server 18 via the network 20. Additionally, the methods and algorithms described herein may be conducted partly by the electronic device 12, partly by the server 18 and partly by any other computer or electronic device included in the computing system 100 via the network 20. Moreover, the example methods described herein may be conducted entirely on other computer systems (not shown) and other electronic devices 10 (not shown). Thus, it is contemplated by the present disclosure that the example methods and algorithms described herein may be conducted using any combination of computers (not shown), computer systems (not shown), and electronic devices (not shown). Furthermore, data described herein as being stored in the electronic device 12 may alternatively, or additionally, be stored in the server 18, or in any computer system (not shown) or electronic device (not shown) operable to communicate with the electronic device 12 over the network 20.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. An electronic device for enhancing detection of morphed biometric modality data comprising:

a processor; and a memory configured to store data, said electronic device being associated with a network and said memory being in communication with said processor and having instructions stored thereon which, when read and executed by said processor, cause said electronic device to:

receive biometric modality data of a person, the biometric modality data including a digital facial image of the person and at least one video of the person, wherein each frame of the video includes a facial image of the person, the digital facial image and each facial image in the video include facial landmarks;

perform wavelet decomposition on the digital facial image to isolate high-frequency artifacts indicative of morphing;

analyze temporal differences of facial landmarks between the video frames to detect unnatural micro-expressions;

calculate, based on the wavelet decomposition results, a first deviation score for the digital facial image;

calculate, based on the temporal difference analysis, a second deviation score for the video;

combine the first and second deviation scores into an aggregate detection score;

compare the cross-modality score against a threshold value; and determine that the biometric modality data is morphed in response to determining that the cross-modality score satisfies the threshold value.

2. The electronic device according to claim 1, wherein the instructions when read and executed by said processor, further cause said electronic device to:

compare the artifacts against sensor noise patterns; and in response to detecting artifacts not associated with characteristics of an imaging device that captured the digital facial image, determining the digital facial image was morphed.

3. The electronic device according to claim 1, wherein the instructions when read and executed by said processor, further cause said electronic device to:

extract high-dimensional feature vectors from the digital facial image and the at least one video using one or more trained machine learning models; and determine whether the received digital facial image and at least one video are morphed based on the extracted vectors.

4. The electronic device according to claim 1, wherein the high-frequency artifacts comprise:

texture inconsistencies;

edge sharpness variations; and pixel level anomalies.

5. The electronic device according to claim 1, wherein the instructions when read and executed by said processor, further cause said electronic device to:

determine whether the digital facial image is of a live person; and determine whether the video is of a live person.

6. The electronic device according to claim 1, wherein the instructions when read and executed by said processor, further cause said electronic device to determine the threshold based on at least one of a Mahalanobis distance and a Kullback-Leibler divergence.

7. A method for enhancing detection of morphed biometric modality data comprising the steps of:

receiving, by an electronic device, biometric modality data of a person, the biometric modality data including a digital facial image of the person and at least one video of the person, wherein each frame of the video includes a facial image of the person, the digital facial image and each facial image in the video include facial landmarks;

performing wavelet decomposition on the digital facial image to isolate high-frequency artifacts indicative of morphing;

analyzing temporal differences of facial landmarks between the video frames to detect unnatural micro-expressions;

calculating, based on the wavelet decomposition results, a first deviation score for the digital facial image;

calculating, based on the temporal difference analysis, a second deviation score for the video;

combining the first and second deviation scores into an aggregate detection score;

comparing the cross-modality score against a threshold value; and determining that the biometric modality data is morphed in response to determining that the cross-modality score satisfies the threshold value.

8. The method according to claim 7 further comprising:

comparing the artifacts against sensor noise patterns; and in response to detecting artifacts not associated with characteristics of an imaging device that captured the digital facial image, determining the digital facial image was morphed.

9. The method according to claim 7 further comprising:

extracting high-dimensional feature vectors from the digital facial image and the at least one video using one or more trained machine learning models; and determining whether the received digital facial image and at least one video are morphed based on the extracted vectors.

10. The method according to claim 7 wherein the high-frequency artifacts comprise:

texture inconsistencies;

edge sharpness variations; and pixel level anomalies.

11. The method according to claim 7 further comprising:

determining whether the digital facial image is of a live person; and determining whether the video is of a live person.

12. The method according to claim 7, further comprising determining the threshold based on at least one of a Mahalanobis distance and a Kullback-Leibler divergence.

13. A non-transitory computer-readable recording medium in an electronic device for enhancing detection of morphed biometric modality data, the non-transitory computer-readable recording medium storing instructions which when executed by a hardware processor cause the non-transitory recording medium to perform steps comprising:

receiving biometric modality data of a person, the biometric modality data including a digital facial image of the person and at least one video of the person, wherein each frame of the video includes a facial image of the person, the digital facial image and each facial image in the video include facial landmarks;

performing wavelet decomposition on the digital facial image to isolate high-frequency artifacts indicative of morphing;

analyzing temporal differences of facial landmarks between the video frames to detect unnatural micro-expressions;

calculating, based on the wavelet decomposition results, a first deviation score for the digital facial image;

calculating, based on the temporal difference analysis, a second deviation score for the video;

combining the first and second deviation scores into an aggregate detection score;

comparing the cross-modality score against a threshold value; and determining that the biometric modality data is morphed in response to determining that the cross-modality score satisfies the threshold value.

14. The non-transitory computer-readable recording medium according to claim 13, wherein the instructions when read and executed by said processor, cause said non-transitory computer-readable recording medium to perform steps comprising:

comparing the artifacts against sensor noise patterns; and in response to detecting artifacts not associated with characteristics of an imaging device that captured the digital facial image, determining the digital facial image was morphed.

15. The non-transitory computer-readable recording medium according to claim 13, wherein the instructions when read and executed by said processor, cause said non-transitory computer-readable recording medium to perform steps comprising:

extracting high-dimensional feature vectors from the digital facial image and the at least one video using one or more trained machine learning models; and determining whether the received digital facial image and at least one video are morphed based on the extracted vectors.

16. The non-transitory computer-readable recording medium according to claim 13, wherein the high-frequency artifacts comprise:

texture inconsistencies;

edge sharpness variations; and pixel level anomalies.

17. The non-transitory computer-readable recording medium according to claim 13, wherein the instructions when read and executed by said processor, cause said non-transitory computer-readable recording medium to perform steps comprising:

determining whether the digital facial image is of a live person; and determining whether the video is of a live person.

18. The non-transitory computer-readable recording medium according to claim 13, wherein the instructions when read and executed by said processor, cause said non-transitory computer-readable recording medium to perform the step of determining the threshold based on at least one of a Mahalanobis distance and a Kullback-Leibler divergence.

* * * * *